O. Sheldon,
Making Staves,
N°1,786.                    Patented Sep. 10, 1840.
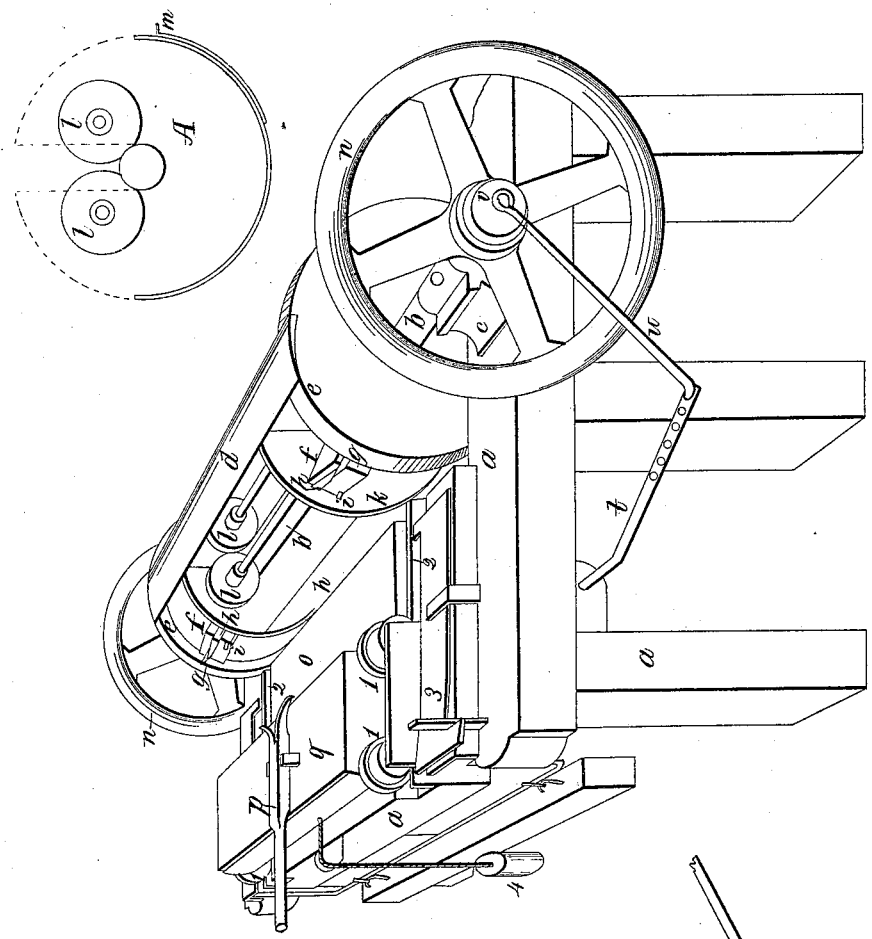
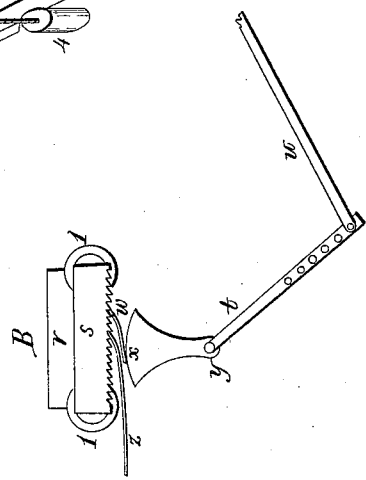

UNITED STATES PATENT OFFICE.

OLIVER SHELDON, OF NEW MARLBOROUGH, MASSACHUSETTS.

MACHINE FOR CUTTING STAVES.

Specification of Letters Patent No. 1,736, dated September 10, 1840.

*To all whom it may concern:*

Be it known that I, OLIVER SHELDON, of New Marlborough, in the county of Berkshire and State of Massachusetts, have invented a new and useful Machine for Cutting Staves; and I do hereby declare that the following is a full and exact description.

The nature of my invention consists in a machine for cutting staves for barrels or other casks, transversely or widthwise of the grain of the timber, by means of a revolving knife, and for cutting the staves to their required lengths, and for chamfering or beveling the inside ends of the staves to form the chime, and for grooving them to receive the heads of the cask, by one and the same operation of the machine.

To enable others skilled in the art, to make and use my invention, I will proceed to describe its construction and operation.

I construct a strong frame *a a a*, see the accompanying drawing, which is intended to be a part of this specification, of suitable dimensions for the purpose, say 7 feet long by 6 feet wide, and 3 feet high. An arbor or shaft *b b*, is placed across the frame toward the forward end, supported by, and turning in boxes *c*. The cutting knife *d*, of a length at least equal to the longest staves intended to be cut by the machine, is made fast at either end, to the two disks *e e* which are centrally and permanently fixed to the arbor.

The apparatus for cutting off the ends of the staves, and for chamfering and grooving them for the heads of the cask, are seen at *f f*, consisting of two arms, usually made of iron, one end of each of these arms is fitted to the arbor, their length projecting outwards at right angles with the arbor, but so fitted as that they may be moved towards, or from each other; to enable them to be adjusted to the required length of the staves to be cut. The outward ends of the arms are shaped to correspond with the chamfer of the ends of the staves, and are each provided with three cutters. The first, *g g*, project in the direction of the length of the arms, and are intended to cut off the ends of the staves. The second, *h h*, the cutting part of these pass along over, and correspond in their direction with the beveled ends of the arms. These cutters are placed a sufficient distance from the ends of the arms to allow the chip they cut off to pass between them and the ends of the arms. The use of these last described cutters is to form the bevel or chamfer of the staves. The third, *i i*, are to form the groove to receive the heads of the cask. These project from the ends of the arms, in the direction of their length, and are so placed as to cut the grooves at the proper distance from the ends of the staves. The arms are of course, required to be of a length, measuring from the center of the arbor, equal to half the head diameter of the cask the staves are designed for, and are so placed on the arbor as to precede the knife in their operation. An apparatus is provided to take the stave off from the machine, shown at *k k*, and more accurately in the profile section A, this is a semicylinder, equal in diameter to the inside diameter of the cask designed to be made of the staves, and is suspended to the arbor by the friction rollers *l l*. This half cylinder is prevented from revolving with the arbor by being weighted in the inside, which keeps it in one position. It is designed to receive the stave (after the stave is separated from the block of timber by the knife) between itself and the knife, and carry it around under the half cylinder, until it arrives at the opposite side, where it is arrested by the spring or hook *m*, which dislodges, and suffers it to drop from the machine.

To give steadiness, and to preserve the momentum of the revolutions I use balance wheels *n n*.

The block of timber from which the staves are to be cut, is to be placed on the platform *o*, and is sustained in its place by the dog *p* attached to the carriage *q*.

The manner of feeding up the block of timber as the staves are cut off one after another, may be best understood by inspecting the section B, of the drawing, where *r* represents the end of the carriage, and *s*, a toothed rack attached to the carriage. These teeth graduate the thickness of the staves. The carriage is advanced up toward the revolving knife, by the bent lever *t*, and the pitman *u*, which it attached eccentrically to the balance wheel as shown at *v*. The spring *w*, (section B) being joined to the bent lever at *x*, is to propel the carriage forward, the lever acting upon its center and fulcrum *y*. The spring *z*, is to prevent the carriage from receding while the spring *w*, is passing to the next tooth of the rack.

The friction wheels 1, 1, are to facilitate the moving of the carriage, plying upon the rails 2, 2.

The spring 3 is a part of a system of machinery by which the springs $w$, and $z$, are borne down, disengaging them from the teeth of the rack, and thereby suffering the carriage to be drawn back by the weight 4. But as this apparatus is now common, being used in various machines for other purposes, and being not essential to the operation of this machine, I deem a particular description of it unnecessary. The arbor, and with it the knife, arms and the other revolving parts may be put in motion by a crank, or by a belt and pulleys, or otherwise according to circumstances.

I claim as my invention and desire to secure by Letters Patent—

The cutters for forming the chamfer and groove, and for cutting off the ends of the staves, fixed to the revolving arms as herein described, or in any similar manner, combined with the revolving knife for cutting the staves off from the block of timber, as herein described.

OLIVER SHELDON.

Witnesses:
LEMUEL HEDGE,
EDMUND CANFIELD.